(12) United States Patent
Masuo et al.

(10) Patent No.: US 11,260,874 B2
(45) Date of Patent: Mar. 1, 2022

(54) DRIVER ASSISTANCE DEVICE THAT CAN BE MOUNTED ON A VEHICLE

(71) Applicant: Panasonic Intellectual Property Management Co., Ltd., Osaka (JP)

(72) Inventors: Akira Masuo, Kanagawa (JP); Junichi Yukawa, Kanagawa (JP); Kenji Sugihara, Tokyo (JP)

(73) Assignee: PANASONIC INIELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/004,796

(22) Filed: Aug. 27, 2020

(65) Prior Publication Data

US 2020/0391754 A1 Dec. 17, 2020

Related U.S. Application Data

(63) Continuation of application No. PCT/JP2019/009977, filed on Mar. 12, 2019.

(30) Foreign Application Priority Data

Mar. 23, 2018 (JP) .............................. JP2018-056970

(51) Int. Cl.
*B60W 40/09* (2012.01)
*B60W 50/14* (2020.01)
(Continued)

(52) U.S. Cl.
CPC ............ *B60W 40/09* (2013.01); *B60W 50/14* (2013.01); *G06K 9/00791* (2013.01);
(Continued)

(58) Field of Classification Search
CPC ................ B60W 40/09; B60W 50/14; B60W 2540/229; B60W 2040/0827;
(Continued)

(56) References Cited

U.S. PATENT DOCUMENTS 10,475,127 B1 * 11/2019 Potter .................... G06Q 40/08
10,805,068 B1 * 10/2020 Leise .................... G07C 5/008
(Continued)

FOREIGN PATENT DOCUMENTS

WO 2017/145693 8/2017

OTHER PUBLICATIONS

International Search Report issued in International Pat. Appl. No. PCT/JP2019/009977, dated Apr. 9, 2019.

*Primary Examiner* — Omar Casillashernandez
(74) *Attorney, Agent, or Firm* — Greenblum & Bernstein, P.L.C.

(57) ABSTRACT

An acquisition unit acquires at least one of first information and second information. A notification unit provides warning information to the driver, the warning information being generated based on at least one of the first information and the second information acquired and indicating a possibility of an increase in an insurance premium of an insurance applied to the driver. An reception unit receives acceptance of the provided warning information from the driver. A processor determines to transmit the acceptance by the driver of the possibility of an increase in the insurance premium to an insurance company server when the acceptance is received and determines to transmit at least one of the first information and the second information to the insurance company server when acceptance is not received.

12 Claims, 5 Drawing Sheets

(51) Int. Cl.
*G06K 9/00* (2022.01)
*G06Q 40/08* (2012.01)
*G07C 5/00* (2006.01)
*B60W 40/08* (2012.01)

(52) U.S. Cl.
CPC ......... *G06K 9/00845* (2013.01); *G06Q 40/08* (2013.01); *G07C 5/008* (2013.01); *B60W 2040/0827* (2013.01); *B60W 2040/0872* (2013.01); *B60W 2050/146* (2013.01); *B60W 2540/229* (2020.02); *B60W 2540/30* (2013.01)

(58) Field of Classification Search
CPC ... B60W 2040/0872; B60W 2050/146; B60W 2540/30; B60W 2540/215; B60W 2540/221; B60W 40/08; G06K 9/00791; G06K 9/00845; G06K 9/0061; G06K 9/00302; G06Q 40/08; G07C 5/008; G07C 5/0808; G07C 5/0825; G08G 1/16
See application file for complete search history.

(56) References Cited

U.S. PATENT DOCUMENTS

| | | | |
|---|---|---|---|
| 10,984,479 B1* | 4/2021 | Kyne | H04W 4/029 |
| 11,017,475 B1* | 5/2021 | Dunham | G06Q 40/08 |
| 2003/0187704 A1* | 10/2003 | Hashiguchi | G06Q 40/08 705/4 |
| 2014/0257870 A1* | 9/2014 | Cielocha | G07C 5/008 705/4 |
| 2015/0025917 A1* | 1/2015 | Stempora | G06K 9/0061 705/4 |
| 2015/0088550 A1* | 3/2015 | Bowers | G06Q 40/08 705/4 |
| 2021/0166322 A1* | 6/2021 | Allen | G06Q 40/08 |

* cited by examiner

DRIVER ASSISTANCE DEVICE THAT CAN BE MOUNTED ON A VEHICLE

BACKGROUND

1. Field

The present disclosure relates to a driver assistance device that can be mounted on a vehicle.

2. Description of the Related Art

A safe driving server is adapted to communicate with a vehicle-mounted unit on a vehicle and is adapted to determine a level of risky driving by the driver based on vehicle information, etc. received from the vehicle-mounted unit and then to estimate a change from the current value of the insurance premium of the auto insurance. When the estimation result is received from the safe driving server, the vehicle-mounted unit displays the estimation result (see, for example patent literature 1).

[patent literature 1] WO17/145693

In the related art, the level of risky driving has been determined based on the behavior of the driver, but the condition of the driver outside or inside the vehicle has not been considered. For example, when the driver who had driven a vehicle in a condition not short of sleep drives in a sleep-deprived condition, for example, the level of risky driving may grow. It is desired that such a condition be recognized as early as possible.

SUMMARY

The present disclosure addresses the above-described issue, and a general purpose thereof is to provide a technology of outputting a warning based on the driver's condition.

A driver assistance device according to an embodiment of the present disclosure is a driver assistance device that can be mounted on a vehicle, including: an acquisition unit that acquires at least one of first information related to a condition of life of a driver outside the vehicle and second information related to a situation of driving by the driver inside the vehicle; a notification unit that provides warning information to the driver, the warning information being generated based on at least one of the first information and the second information acquired by the acquisition unit and indicating a possibility of an increase in an insurance premium of an insurance applied to the driver; an reception unit that receives acceptance of the warning information provided by the notification unit from the driver; and a processor that determines to transmit the acceptance by the driver of the possibility of an increase in the insurance premium to an external server when the reception unit receives the acceptance and determines to transmit at least one of the first information and the second information to the external server when the reception unit does not receive acceptance.

Optional combinations of the aforementioned constituting elements, and implementations of the present disclosure in the form of devices, systems, methods, programs, recording mediums having programs recorded thereon, and vehicles carrying the device may also be practiced as additional modes of the present disclosure.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Figure 1:
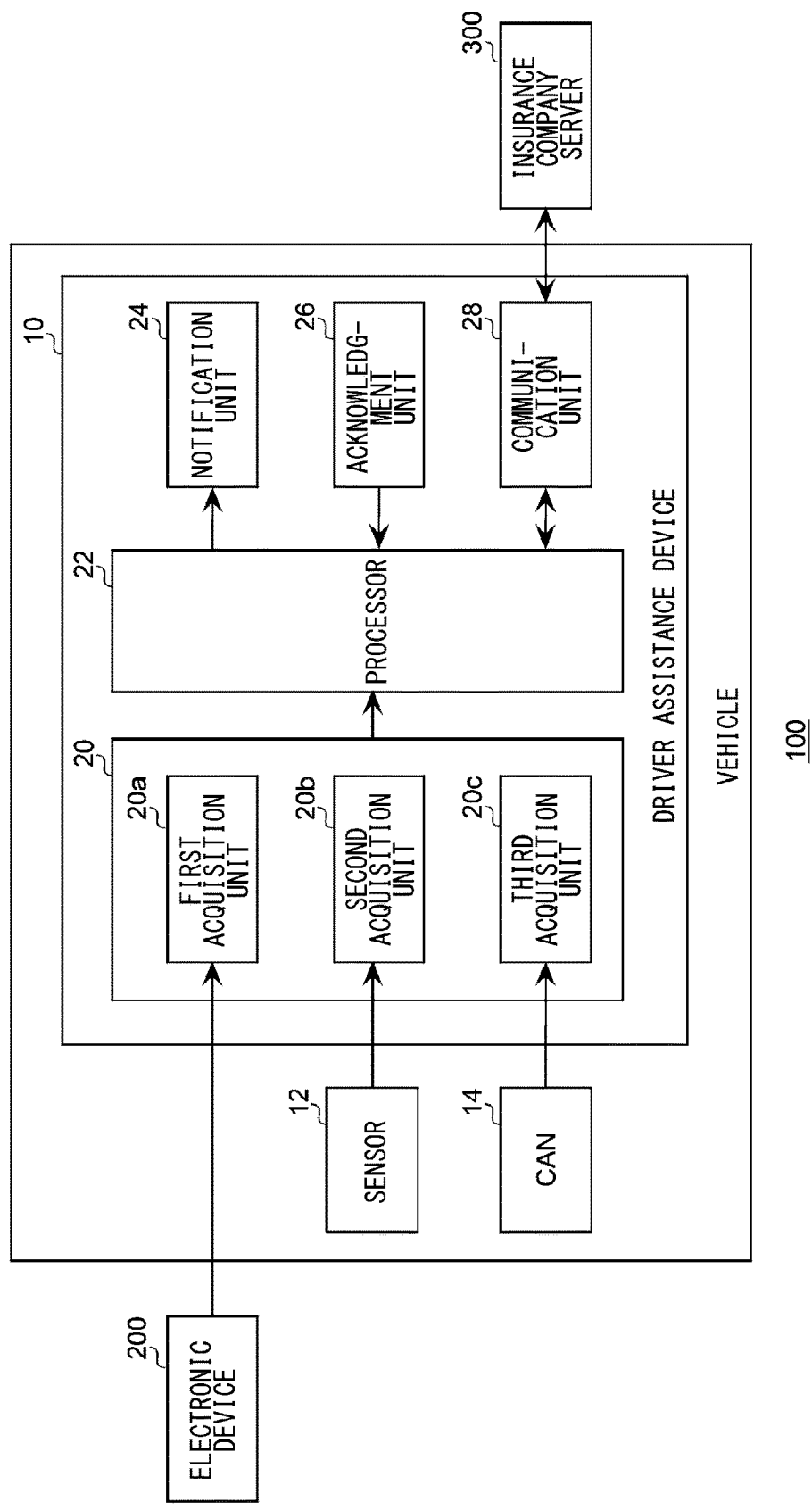
FIG. 1 shows a configuration of a vehicle according to the embodiment.

The invention will now be described by reference to the preferred embodiments. This does not intend to limit the scope of the present invention, but to exemplify the invention.

A brief summary will be given before describing the present disclosure in specific details. The embodiment relates to a driver assistance device that can be mounted on a vehicle and that provides a warning to the driver when the risk of driving the vehicle grows. In the related art, information related to the past behavior of a driver is used to determine the risk of driving a vehicle. The risk of driving a vehicle can be determined not only by referring to the past behavior of the driver but also by referring to the drowsiness of the driver. When the driver is drowsy, for example, the risk of driving the vehicle grows, and a warning should be given to the driver. Meanwhile, it is not known whether the driver understands the detail of a warning merely by giving a warning to the driver. It is desired that the driver understands the detail of a warning. In this background, the driver assistance device according to the embodiment performs the following process.

In order to understand the degree of drowsiness of a driver, the driver assistance device uses at least one of the first information related to the condition of life of the driver and the second information related to the situation of driving by the driver. The first information comprises, for example, sleep efficiency or sleep duration and is acquired by a vital sensor mounted on an electronic device such as a watch and a smartphone. The second information comprises arousal level and is acquired by referring to an image captured by a sensor such as an imaging device mounted on a vehicle cabin. In other words, the first information and the second information exhibit a value indicating the drowsiness of the driver. The driver assistance device determines the risk of driving based on at least one of the first information and the second information. When the risk of driving grows, the driver assistance device gives warning information to the driver.

In this process, warning information indicating that the insurance premium may increase is given, and a response about whether to accept the possibility of an increase in the insurance premium is received from the driver, to let the driver understand the detail of the warning information and prompt the driver to determine to avoid driving in the current condition of the driver. When acceptance is received from the driver, the driver assistance device transmits acceptance information indicating acceptance of the possibility of an increase in the insurance premium to the insurance company server. When acceptance is not received from the driver, i.e., when the driver indicates a rejection, on the other hand, the driver assistance device transmits at least one of the first information and the second information to the insurance company server if the driver continues to drive the vehicle. In other words, if the driver rejects the possibility of an increase in the insurance company and if the driver continues to drive the vehicle, at least one of the first information and the second information on the driver will be monitored by the insurance company. The embodiment will now be described in details with reference to the drawings. The embodiment described below is by way of example only, and the present disclosure is not limited by the embodiment.

FIG. 1 shows a configuration of a vehicle 100. The vehicle 100 includes a driver assistance device 10, a sensor 12, a controller area network (CAN) 14. The driver assistance device 10 includes a first acquisition unit 20a, a second acquisition unit 20b, a third acquisition unit 20c, which are generically referred to as acquisition units 20, a processor 22, a notification unit 24, an reception unit 26, and a communication unit 28. The driver assistance device 10 is connected to an electronic device 200 and an insurance company server 300.

The electronic device 200 is, for example, a watch or a smartphone. A vital sensor is mounted and a communication function is installed in the electronic device 200. The electronic device 200 uses the vital sensor to measure the sleep efficiency, sleep duration, etc. in the daily life of the driver. Items of measurements are not limited to these, and items that make it possible to know the drowsiness of the driver may be measured. A publicly known technology may be used for the measurement, and a description thereof is omitted. Hereinafter, information related to the condition of life of the driver outside the vehicle 100 will be referred to as "first information". The first information is already measured before the driver enters the vehicle 100. The electronic device 200 transmits the first information to the driver assistance device 10 by wireless communication. For example, Bluetooth (registered trademark) is used for wireless communication, but the disclosure is non-limiting as to the type of wireless communication.

The first acquisition unit 20a performs wireless communication with the electronic device 200 and acquires the first information from the electronic device 200. When the driver carrying the electronic device 200 approaches the vehicle 100 to enter the vehicle 100, for example, the first acquisition unit 20a receives the first information already measured outside the vehicle 100.

The sensor 12 is, for example, a camera mounted in the vehicle cabin and images the face of the driver driving the vehicle. The sensor 12 recognizes the facial expression of the driver by performing an image recognition process on the image capturing the face of the driver. The sensor 12 estimates the arousal level of the driver as indicating the condition of the driver, based on the recognized facial expression. A publicly known technology may be used for image recognition process and estimation of arousal level, and a description thereof is omitted. By way of one example of arousal level of a driver, the drowsiness level defined in the evaluation method from New Energy and Industrial Technology Development Organization (NEDO) for estimating drowsiness from a facial expression, is used. The method is defined to evaluate drowsiness level in five stage from 1 to 5. More specifically, a subject in "drowsiness level 1" is estimated not to be drowsy at all, "drowsiness level 2" to be slightly drowsy, "drowsiness level 3" to be drowsy, "drowsiness level 4" to be not a little drowsy, and "drowsiness level 5" to be very drowsy.

When the movement of the line of sight is quick and frequent, or when blinks occur at a stable period of, for example, two times per two seconds, or when the movement of the line of sight is active and accompanies a motion of the body, the sensor 12 estimates that the driver is in "drowsiness level 1". When the lips are open, or when the movement of the line of sight is slow, the sensor 12 estimates that the driver is in "drowsiness level 2". When blinks occur slowly and frequently, or when there is a movement of the mouth, or when the driver corrects his or her posture, or when the driver moves his or her hand toward the face, the sensor 12 estimates that the driver is in "drowsiness level 3". When the driver blinks apparently consciously, or when there is an unnecessary movement of the whole body such as shaking of the head and up-and-down movement of the shoulder, or when the driver yawns frequently and takes a deep breath, or when the blink and the movement of the line of sight are slow, the sensor 12 estimates that the driver is in "drowsiness level 4". When the eyelids are closed, or when the head is tilted forward, or when the head is tipped backward, the sensor 12 estimates that the driver is in "drowsiness level 5". According to this definition, the closer to the drowsiness level 1, the higher the arousal level, and, the closer to the drowsiness level 5, the lower the arousal level.

Hereinafter, information related to the situation of driving by the driver inside the vehicle 100 will be referred to as "second information". The second information is measured while the driver is driving the vehicle 100. The sensor 12 outputs the second information to the second acquisition unit 20b. The second acquisition unit 20b acquires the second information from the sensor 12. For example, the second acquisition unit 20b receives the second information periodically while the driver is driving the vehicle 100. Thus, the acquisition unit 20 acquires at least one of the first information and the second information.

The CAN 14 is connected to various sensors for detecting the situation outside the vehicle or the condition of the vehicle 100 and receives detection information including the detection result detected in the sensors. In particular, the detection information from the sensors (e.g., speed sensor, acceleration sensor, gyro sensor, geomagnetic sensor, tilt sensor, etc.) for detecting the condition of the vehicle 100 is received in this case. The CAN 14 outputs the detection information to the third acquisition unit 20c. The third acquisition unit 20c acquires the detection information from the CAN 14.

The processor 22 refers to the second information received by the third acquisition unit 20c to identify the first stage defined to start when the driver enters the vehicle 100 and end when the driver starts driving the vehicle and the second stage following the first stage and defined to start when the driver starts driving the vehicle. For example, the processor 22 identifies the first stage when the detection information indicates that the vehicle is at a stop since the engine or the motor is detected to be started. Meanwhile, the processor 22 identifies the second stage when the detection information indicates that the vehicle is moving during the first stage.

The processor 22 receives the first information from the first acquisition unit 20a during the first stage. The processor 22 compares the sleep efficiency indicated by the first information with a threshold value. When the sleep efficiency is lower than the threshold value, the processor 22 determines that a warning status has occurred. Meanwhile, the processor 22 determines that a warning status has not occurred when the sleep efficiency is equal to or higher than the threshold value. In the case sleep duration is used in place of sleep efficiency, the processor 22 determines that a warning status has occurred when the sleep duration is shorter than a threshold value and determines that a warning status has not occurred when the sleep duration is equal to or longer than the threshold value.

When the processor 22 determines that a warning status has occurred, the processor 22 generates an inquiry signal for inquiring about the insurance premium of the insurance that the driver subscribes to. The processor 22 maintains the subscriber number for identifying the driver and stores the subscriber number in the inquiry signal. The processor 22 outputs the inquiry signal to the communication unit 28. The communication unit 28 performs wireless communication with the insurance company server 300 and transmits the inquiry signal to the insurance company server 300. The wireless communication system that is run in the communication unit 28 may be different from or identical to the wireless communication system run in the first acquisition unit 20*a*.

The insurance company server 300 is a server for managing the operation of the insurance company. The insurance company server 300 may be placed in the insurance company or placed outside the insurance company. The insurance company server 300 may be built from a plurality of devices. When the insurance company server 300 receives the inquiry signal from the driver assistance device 10, the insurance company server 300 performs a recognition process by referring to the subscription number included in the inquiry signal. A publicly known technology may be used in the recognition process and a description thereof is omitted. When authentication is successful, response information including certified subscription information corresponding to the subscription number is generated. The insurance company server 300 transmits the response information to the driver assistance device 10.

When the communication unit 28 receives the response information from the insurance company server 300, the communication unit 28 outputs the response information to the processor 22. When the processor 22 receives the response information, the processor 22 extracts the subscription information and, in particular, information on the insurance premium, included in the response information. The processor 22 calculates, based on the extracted insurance premium, the updated insurance premium that could be applied when the vehicle is driven in the warning status. This may be the insurance premium updated and applied next year when the vehicle is driven in a warning status and an accident is caused. The calculation formula for deriving the updated insurance premium is stored in the processor 22 in advance. The premium rate may be processed in place of the insurance premium. The processor 22 generates warning information indicating the possibility of an increase in the insurance premium of the insurance applied to the driver, based on the calculated insurance premium. The processor 22 outputs the warning information to the notification unit 24.

Figure 2A:
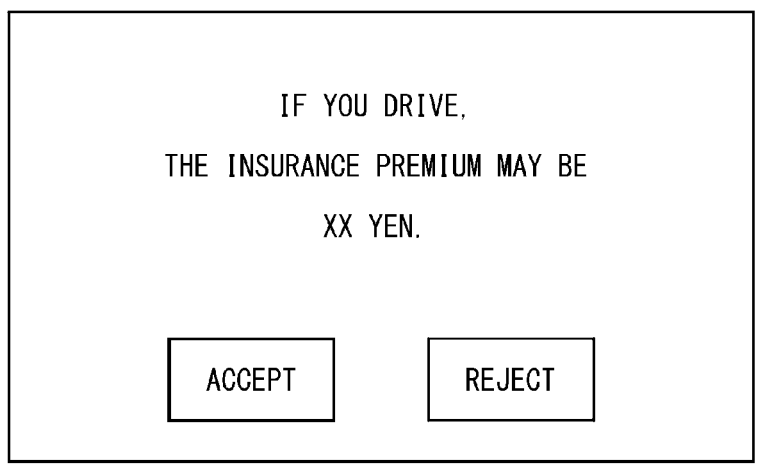
FIGS. 2A-2B show screens displayed in the notification unit of FIG. 1.
Figure 2B:
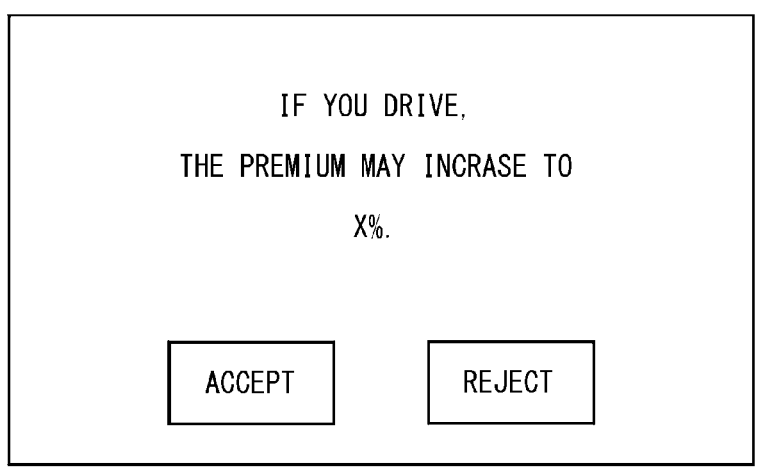

The notification unit 24 is, for example, a car navigation system, a head-up display, or a center display installed in the vehicle cabin. The notification unit 24 displays the warning information received from the processor 22. FIGS. 2A-2B show screens displayed in the notification unit 24. As shown in FIG. 2*a*, the warning information telling "If you drive, the insurance premium may be XX yen" is displayed. Also, an "acceptance button" selected when the detail of the warning information is accepted, and a "rejection button" selected when the detail of the warning information is rejected are displayed. FIG. 2B shows that the warning information indicates that the premium rate may be increased. Reference is made back to FIG. 1.

The reception unit 26 is a user interface device that receives a user operation input by the driver or a passenger. For example, the reception unit 26 is a controller such as a touch-sensitive panel, a lever, a button, a switch, a joystick, and a volume, or a sensor like a camera that recognizes a gesture in a contactless manner, or a sensor like a microphone that recognizes a speech, or a combination thereof. The reception unit 26 and the notification unit 24 may be integrated or may be implemented as a touch-sensitive panel display. The reception unit 26 receives acceptance or rejection of the warning information presented in the notification unit 24 from the driver. In the case the reception unit 26 does not receive an input for a predetermined period of time since the notification unit 24 presented the warning information, it is assumed that the reception unit 26 has received rejection. The reception unit 26 outputs the received input to the processor 22.

When the reception unit 26 received acceptance, the processor 22 determines to transmit the acceptance by the driver of the possibility of an increase in the insurance premium to the insurance company server 300. The processor 22 generates an acceptance signal including the subscription number and information on the acceptance and outputs the acceptance signal to the communication unit 28. The communication unit 28 transmits the acceptance signal to the insurance company server 300. When the reception unit 26 does not receive acceptance, i.e., when the reception unit 26 receives rejection, and when the processor 22 determines that the driver continues to drive the vehicle since the reception of the rejection, on the other hand, the processor 22 determines to transmit the first information received from the first acquisition unit 20*a* to the insurance company server 300. The processor 22 generates a report signal including the subscription number and the first information and outputs the report signal to the communication unit 28. The communication unit 28 transmits the report signal to the insurance company server 300. If, even when the rejection is received, the processor 22 determines that the driver has avoided driving the vehicle by not detecting that the engine or the motor is started, the processor 22 may transmit associated information to the insurance company server 300.

The processor 22 receives the second information from the second acquisition unit 20*b* during the second stage. The processor 22 compares the drowsiness level in the second information and the threshold value. When the arousal level indicated by the drowsiness level is lower than the threshold value, the processor 22 determines that a warning status has occurred. The threshold level is set to, for example, drowsiness level 3. When the arousal level indicated by the drowsiness level is equal to or higher than the threshold value, on the other hand, the processor 22 determines that a warning status has not occurred.

When the processor 22 determines that a warning status has occurred, the processor 22, the notification unit 24, and the reception unit 26 perform the process as described already. In particular, when the reception unit 26 receives acceptance, the processor 22 and the communication unit 28 perform the process as described already. When the reception unit 26 does not receive acceptance, i.e., when the reception unit 26 receives rejection, and when the processor 22 determines that the driver continues to drive the vehicle since the reception of the rejection, the processor 22 determines to transmit the second information received from the second acquisition unit 20*b* to the insurance company server 300. The processor 22 generates a report signal including the subscription number and the second information and outputs the report signal to the communication unit 28. The communication unit 28 transmits the report signal to the insurance company server 300. In particular, when the second acquisition unit 20b has received the second information in succession, the communication unit 28 transmits the report signal to the insurance company server 300 in succession. If, even when the rejection is received, the processor 22 determines that the driver has avoided driving the vehicle by not detecting that the engine or the motor is started, the processor 22 may transmit associated information to the insurance company server 300 as in the case of the first stage. In the case the processor 22 determines that a warning status has occurred, the processor 22, the notification unit 24, and the reception unit 26 may not perform the process if the drive has already accepted the possibility of an increase in the insurance premium during the first stage.

The features are implemented in hardware such as a central processor (CPU), a memory, or other large scale integration (LSI), of any computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 3:
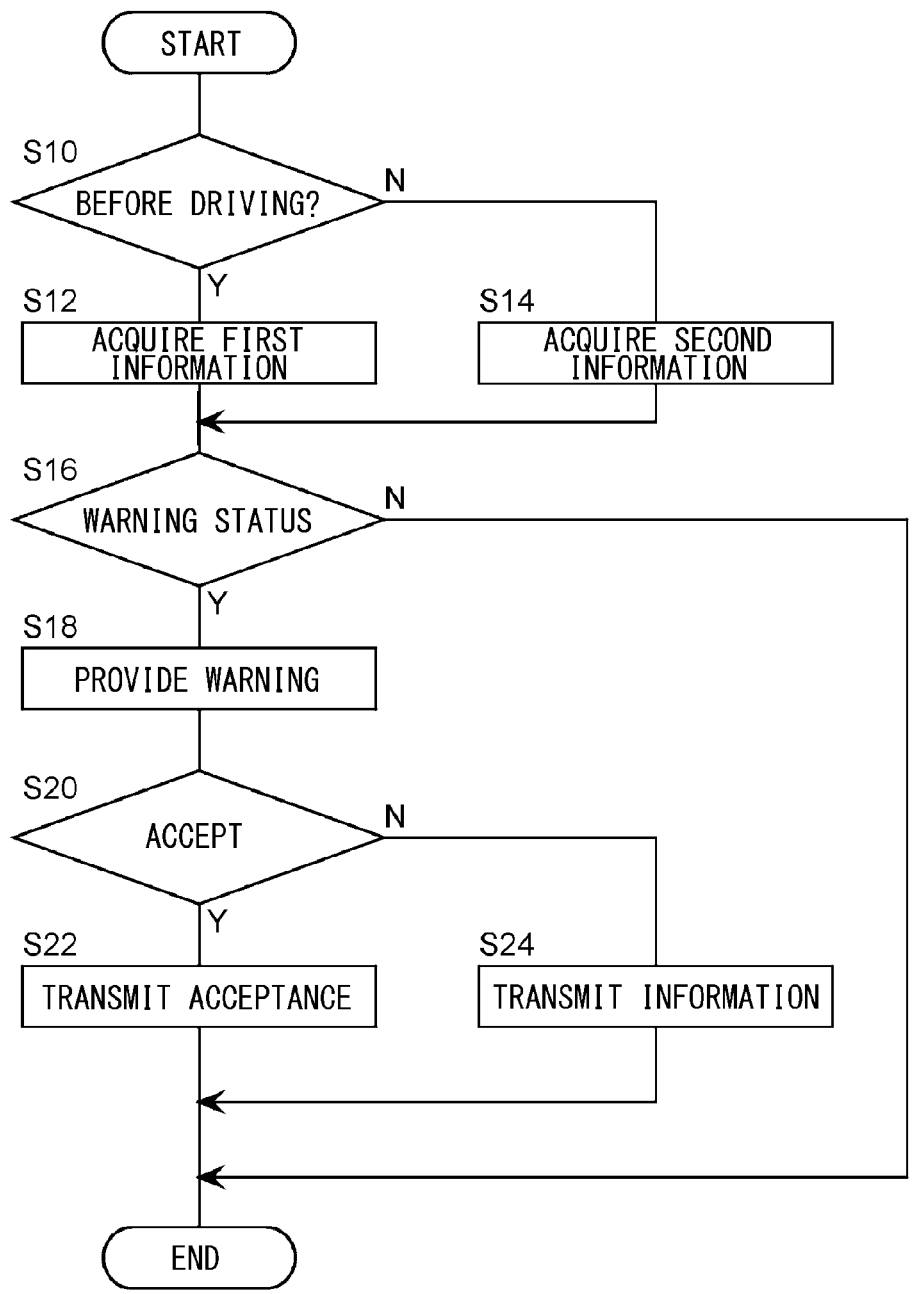
FIG. 3 is a flowchart showing a sequence of steps performed by the driver assistance device of FIG. 1.

A description will be given of the operation of the driver assistance device 10 configured as described above. FIG. 3 is a flowchart showing a sequence of steps performed by the driver assistance device 10. When the driver has not started driving the vehicle yet (Y in step S10). the first acquisition unit 20a acquires the first information from the electronic device 200 (step S12). When the drive has started driving the vehicle (N in step S10), i.e., when the driver is driving the vehicle, the second acquisition unit 20b acquires the second information from the sensor 12 (step S14). When the processor 22 determines that a warning status has occurred (Y in step S16), the notification unit 24 provides a warning to the driver (step S18). When the reception unit 26 receives acceptance regarding the detail of warning from the driver (Y in step S20), the communication unit 28 transmits the acceptance information from the driver to the insurance company server 300 (step S22). When the reception unit 26 does not receive acceptance from the driver (N in step S20) and when the driver continues to drive the vehicle, the communication unit 28 transmits the first information or the second information to the insurance company server 300 (step S24). When the processor 22 does not determine that a warning status has occurred (N in step S16), the process is terminated.

Figure 4:
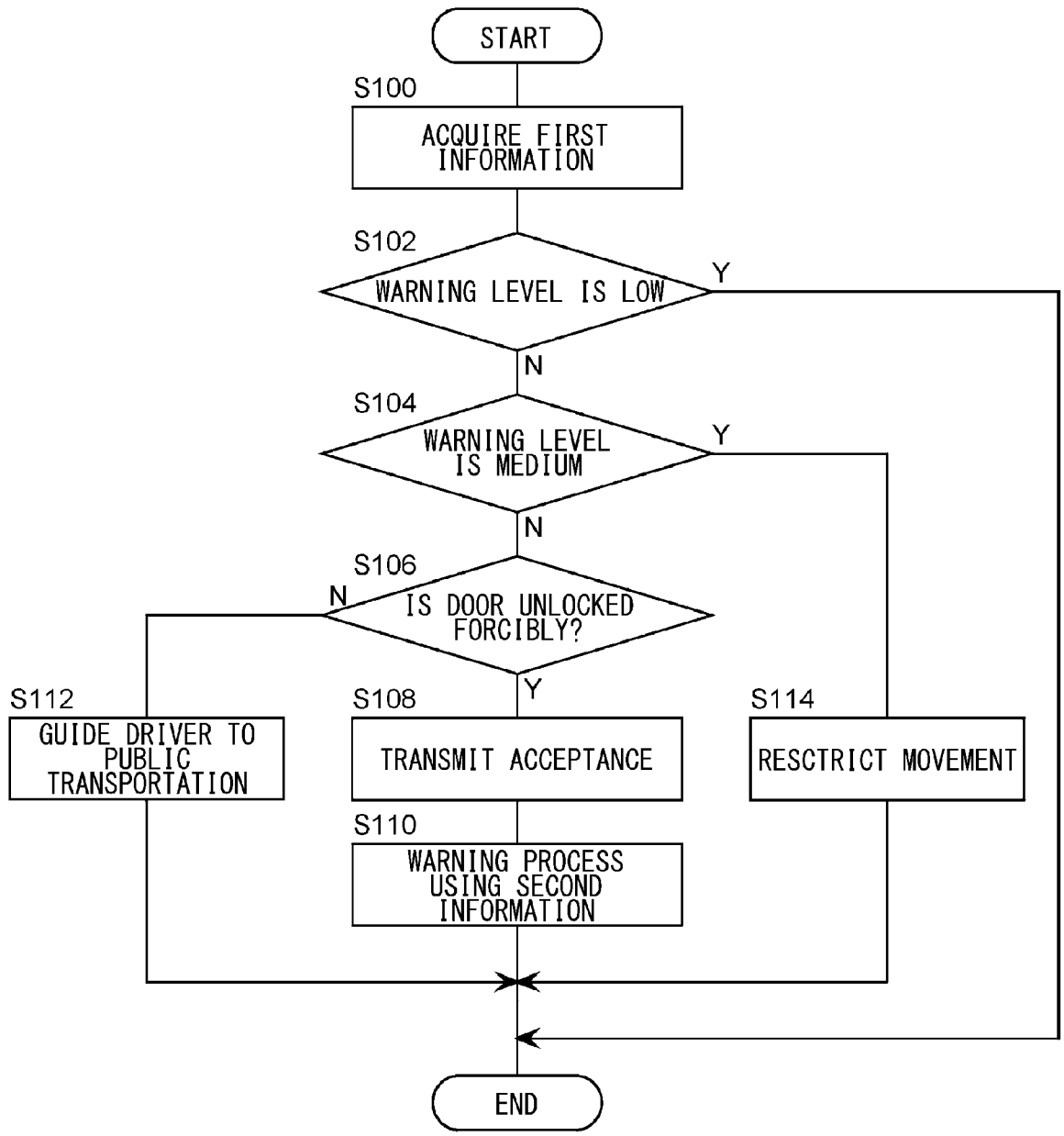
FIG. 4 is a flowchart showing a sequence of steps performed by the driver assistance device according to the variation.

A description will now be given of a variation. It has been described that warning information is provided when a warning status has occurred, and warning information is not provided when a warning status has not occurred. In a variation, a warning status is divided into multiple stages, and processes other than provision of warning information are performed. The vehicle 100 according to the variation is of the same type as that of FIG. 1. The difference from embodiment will mainly be described below. FIG. 4 is a flowchart showing a sequence of steps performed by the driver assistance device 10 according to the variation. The first acquisition unit 20a acquires the first information from the electronic device 200 (step S100). The processor 22 defines the first threshold value and the second threshold value (the first threshold value>the second threshold value) for the sleep efficiency included in the first information. When the sleep efficiency is equal to or higher than the first threshold value, the processor 22 determines that the warning level is low. When the sleep efficiency is lower than the first threshold value and equal to or higher than the second threshold value, the processor 22 determines that the warning level is medium. When the sleep efficiency is lower than the second threshold value, the processor 22 determines that the warning level is high. That the warning level is low means that a warning status has not occurred.

When the result of determination according to the first information shows that the warning level is not low (N in step S102) and the warning level is not medium (N in step S104), it means that the warning level is high. When the warning level is high, the communication unit 28 transmits acceptance information to the insurance company server 300 provided that the third acquisition unit 20c receives information indicating that the door is unlocked forcibly (Y in step S106) from the CAN 14 (S108). Subsequently, the acquisition unit 20, the processor 22, the notification unit 24, and the reception unit 26 perform the warning process using the second information described in the embodiment (step S110). When the third acquisition unit 20c receives information indicating that the door has not been unlocked forcibly from the CAN 14 (N in step S106), the driver assistance device 10 causes the electronic device 200 to guide the driver to a public transportation (step S112). When the warning level is medium (Y in step S104), the driver assistance device 10 restricts the movement of the vehicle 100 (step S114). When restriction of movement is imposed, the vehicle 100 can be moved only a predetermined distance or only at a predetermined speed. When the warning level is low (Y in step S102), step S104 through step S114 are skipped.

Figure 5:
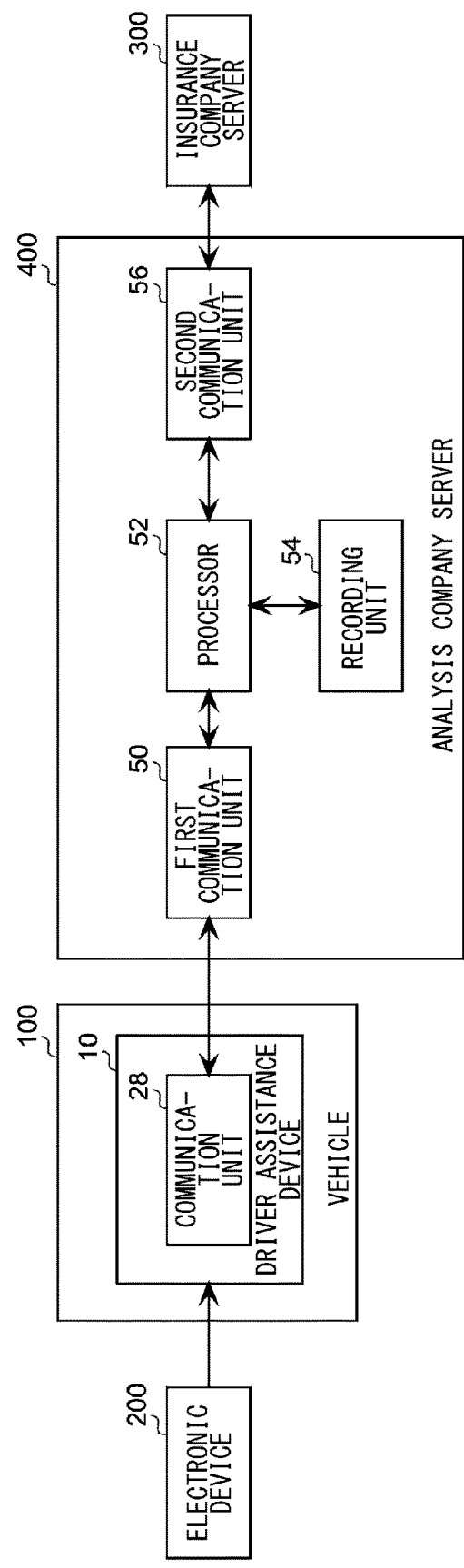
FIG. 5 shows a configuration of the vehicle according to another variation.

A description will now be given of another variation. FIG. 5 shows a configuration of the vehicle 100 according to another variation. As shown in the figure, an analysis company server 400 is added to the configuration shown in FIG. 1. The analysis company server 400 includes a first communication unit 50, a processor 52, a recording unit 54, and a second communication unit 56. The first communication unit 50 receives information from the communication unit 28 of the driver assistance device 10. At least one of the first information and the second information is received. The recording unit 54 records information such as the insurance premium acquired in advance from the insurance company server 300 via the second communication unit 56 and the recording unit 54. The processor 52 processes the information received by the first communication unit 50 based on the information stored in the recording unit 54 and outputs the processed information to the second communication unit 56. A publicly known technology may be used to process the information, and a description thereof is omitted. The second communication unit 56 outputs the processed information to the insurance company server 300.

The analysis company server 400 may record information on drivers in the recording unit 54 and provide the information to the insurance company server 300 according to a predetermined timing schedule instead of on a real-time basis. Further, the analysis company server 400 may analyze information from multiple drivers (multiple vehicles) and output the analysis to the insurance company server 300. The insurance company server 300 uses this information as a help to review the insurance premium.

According to the embodiment, a determination is made as to whether a warning status has occurred based on the first information or the second information indicating the drowsiness of the driver. Accordingly, the risk of driving can be determined according to the drowsiness of the driver. Further, the possibility of an increase in the insurance premium is presented when a warning status has occurred. Accordingly, a warning can be output based on the condition of the driver. Further, acceptance of the possibility of an increase in the insurance premium is received from the driver. Accordingly, it is confirmed that the driver understands the detail of the warning information. When rejection of the possibility of an increase in the insurance premium is received and when the driver continues to drive the vehicle, at least one of the first information and the second information is transmitted. Accordingly, the insurance company is notified of the condition of the driver. Further, the first information is used before the vehicle is started to be driven, and the second information is used while the vehicle is being driven. Accordingly, precision of determination is improved. Further, at least one of the first information and the second information is transmitted. Accordingly, the insurance company is allowed to use at least one of the first information and the second information. Further, at least one of the first information and the second information is transmitted. Accordingly, the analysis company is allowed to use at least one of the first information and the second information.

One embodiment of the present disclosure is summarized below. A driver assistance device according to an embodiment of the present disclosure is a driver assistance device that can be mounted on a vehicle, including: an acquisition unit that acquires at least one of first information related to a condition of life of a driver outside the vehicle and second information related to a situation of driving by the driver inside the vehicle; a notification unit that provides warning information to the driver, the warning information being generated based on at least one of the first information and the second information acquired by the acquisition unit and indicating a possibility of an increase in an insurance premium of an insurance applied to the driver; an reception unit that receives acceptance of the warning information provided by the notification unit from the driver; and a processor that determines to transmit the acceptance by the driver of the possibility of an increase in the insurance premium to an external server when the reception unit receives the acceptance, and determines to transmit at least one of the first information and the second information to the external server when the reception unit does not receive acceptance.

According to this embodiment, acceptance of the possibility of an increase in the insurance premium is transmitted when the acceptance is received from the driver, and at least one of the first information and the second information is transmitted when acceptance of the warning information is not received from the driver. Accordingly, a warning can be output based on the condition of the driver.

The notification unit may provide warning information generated based on the first information during a first stage and provide warning information generated based on the second information during a second stage, the second stage following the first stage and being defined to start when the driver starts driving. In this case, the first information is used before the driving is started, and the second information is used during the driving. Accordingly, precision of determination is improved.

The device may further include a communication unit that transmits at least one of the first information and the second information when the processor determines to transmit at least one of the first information and the second information to the external server. In this case, at least one of the first information and the second information is transmitted so that the external server is allowed to use at least one of the first information and the second information.

The external server may be an insurance company server. In this case, the insurance company is allowed to use the information.

The external server may be an analysis company server connected between the driver assistance device and an insurance company server, and the analysis company server may transmit information obtained by processing at least one of the first information and the second information to the insurance company server. In this case, the analysis company is allowed to use the information.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

In the embodiment, the processor 22 causes the communication unit 28 to transmit the first information or the second information in the case the reception unit 26 does not receive acceptance. Alternatively, the first information or the second information may be transmitted to a server in advance, and the processor 22 may cause the server to transmit the first information or the second information to the insurance company server 300 in the case the reception unit 26 does not receive acceptance. According to this variation, the flexibility in the configuration is improved.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2018-56970, filed on Mar. 23, 2018, the entire contents of which are incorporated herein by reference.

What is claimed is:

1. A driver assistance device that can be mounted on a vehicle, comprising:
    a central processing unit (CPU) that:
    acquires at least one of first information related to a condition of life of a driver outside the vehicle and second information related to a situation of driving by the driver inside the vehicle;
    provides warning information to the driver, the warning information being generated based on at least one of the first information and the second information and indicating a possibility of an increase in an insurance premium of an insurance applied to the driver;
    receives acceptance of the warning information from the driver; and
    determines to transmit the acceptance by the driver of the possibility of an increase in the insurance premium to an external server when the acceptance is received, and determines to transmit at least one of the first information and the second information to the external server when the acceptance is not received.

2. The driver assistance device according to claim 1, wherein
    the CPU provides warning information generated based on the first information during a first stage and provides warning information generated based on the second information during a second stage, the second stage following the first stage and being defined to start when the driver starts driving.

3. The driver assistance device according to claim 1,
wherein the CPU transmits at least one of the first information and the second information when the CPU determines to transmit at least one of the first information and the second information to the external server.

4. The driver assistance device according to claim 2,
wherein the CPU transmits at least one of the first information and the second information when the CPU determines to transmit at least one of the first information and the second information to the external server.

5. The driver assistance device according to claim 1, wherein
the external server is an insurance company server.

6. The driver assistance device according to claim 2, wherein
the external server is an insurance company server.

7. The driver assistance device according to claim 3, wherein
the external server is an insurance company server.

8. The driver assistance device according to claim 4, wherein
the external server is an insurance company server.

9. The driver assistance device according to claim 1, wherein
the external server is an analysis company server connected between the driver assistance device and an insurance company server, and
the analysis company server transmits information obtained by processing at least one of the first information and the second information to the insurance company server.

10. The driver assistance device according to claim 2, wherein
the external server is an analysis company server connected between the driver assistance device and an insurance company server, and
the analysis company server transmits information obtained be processing at least one of the first information and the second information to the insurance company server.

11. The driver assistance device according to claim 3, wherein
the external server is an analysis company server connected between the driver assistance device and an insurance company server, and
the analysis company server transmits information obtained be processing at least one of the first information and the second information to the insurance company server.

12. The driver assistance device according to claim 4, wherein
the external server is an analysis company server connected between the driver assistance device and an insurance company server, and
the analysis company server transmits information obtained be processing at least one of the first information and the second information to the insurance company server.

\* \* \* \* \*